United States Patent [19]

Mitchell

[11] Patent Number: 5,562,389

[45] Date of Patent: Oct. 8, 1996

[54] TIRE LIFT TOOL

[76] Inventor: Frank Mitchell, P.O. Box 192, Benton, Ark. 72018

[21] Appl. No.: 549,962

[22] Filed: Oct. 30, 1995

[51] Int. Cl.$^6$ ............................................ B66F 3/00
[52] U.S. Cl. ..................... 414/428; 254/131; 7/100; 414/426
[58] Field of Search ................................ 414/426, 427, 414/428, 429; 254/11, 91, 94, 131, 133 R, DIG. 3, DIG. 10; 7/100

[56] References Cited

U.S. PATENT DOCUMENTS

| | | | |
|---|---|---|---|
| 1,965,260 | 7/1934 | Rosenberg | 414/428 |
| 2,135,802 | 11/1938 | Dinkins | 280/53 |
| 2,195,635 | 4/1940 | Smischny | 254/131 |
| 2,207,443 | 7/1940 | Schneider | 254/131 |
| 2,345,458 | 3/1944 | Cavon | 280/53 |
| 2,447,435 | 8/1948 | Settle . | |
| 2,483,908 | 10/1949 | Jackson | 414/428 |
| 2,504,345 | 4/1950 | Nellis | 7/1 |
| 2,517,631 | 8/1950 | Coleman | 414/428 |
| 2,546,509 | 2/1951 | Huff . | |
| 2,570,587 | 10/1951 | Noone et al. . | |
| 2,691,454 | 10/1954 | Demlo . | |
| 2,701,707 | 2/1955 | Miller | 7/100 X |
| 2,815,877 | 12/1957 | Marshall . | |
| 3,378,154 | 4/1968 | Mousel . | |
| 3,555,583 | 1/1971 | Mousel | 7/1 |
| 3,828,955 | 8/1974 | Harkey . | |
| 3,976,212 | 8/1976 | Sanchez . | |
| 4,256,430 | 3/1981 | Pugel | 414/428 |
| 4,872,694 | 10/1989 | Griesinger | 280/79.4 |
| 5,176,487 | 1/1993 | Flitton | 414/428 |
| 5,180,141 | 1/1993 | Hunt | 254/131 |

FOREIGN PATENT DOCUMENTS

| | | | |
|---|---|---|---|
| 9007432 | 7/1990 | WIPO | 414/426 |

*Primary Examiner*—Frank E. Werner
*Attorney, Agent, or Firm*—Ray F. Cox, Jr.

[57] ABSTRACT

A tool for assisting in lifting and positioning a tire and wheel assembly into position for installation on or removal from a vehicle hub comprising a pair of arcuate base members, which together form a cradle for receiving the tire. The arcuate base members terminate in a pair of pivot members with beveled points contacting the ground surface for a secure steady lift. Each of the arcuate base members is provided with a lifting member disposed on the proximal end of the arcuate base member so as to support and steady the wheel and tire assembly in a substantially vertical position as it is lifted onto the hub. Handle means for lifting of the tire and wheel assembly may be folded so as to provide a compact configuration for storage.

3 Claims, 4 Drawing Sheets

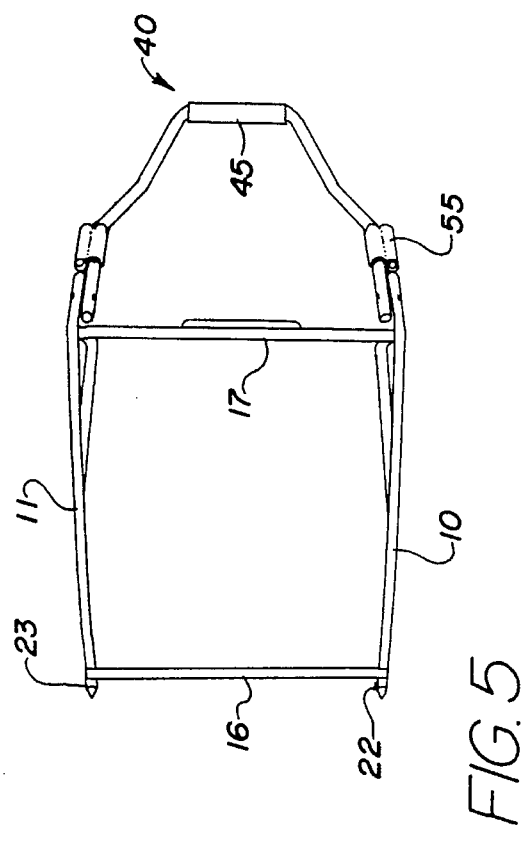
FIG. 4
FIG. 5
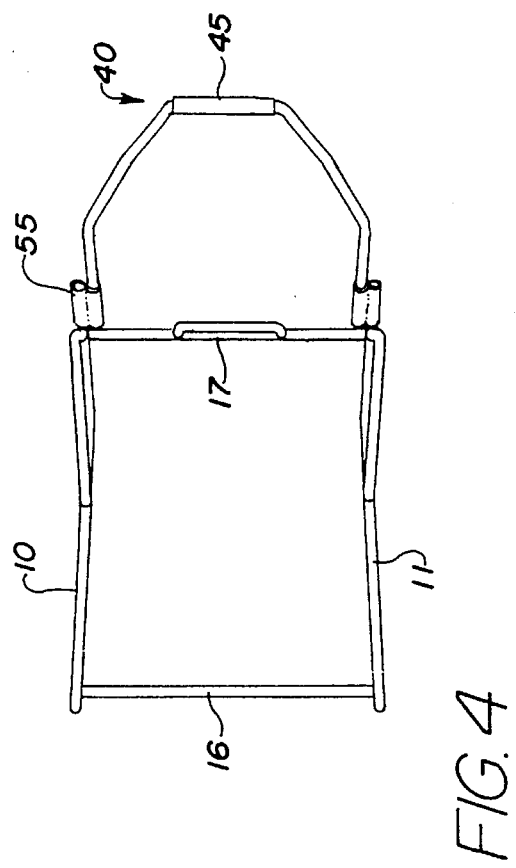
FIG. 6
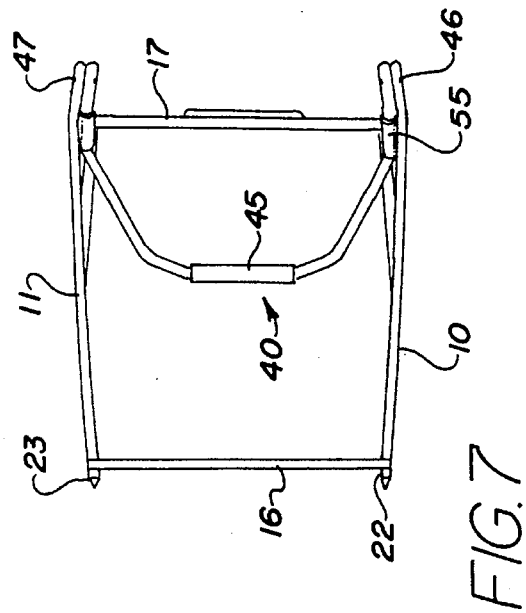
FIG. 7

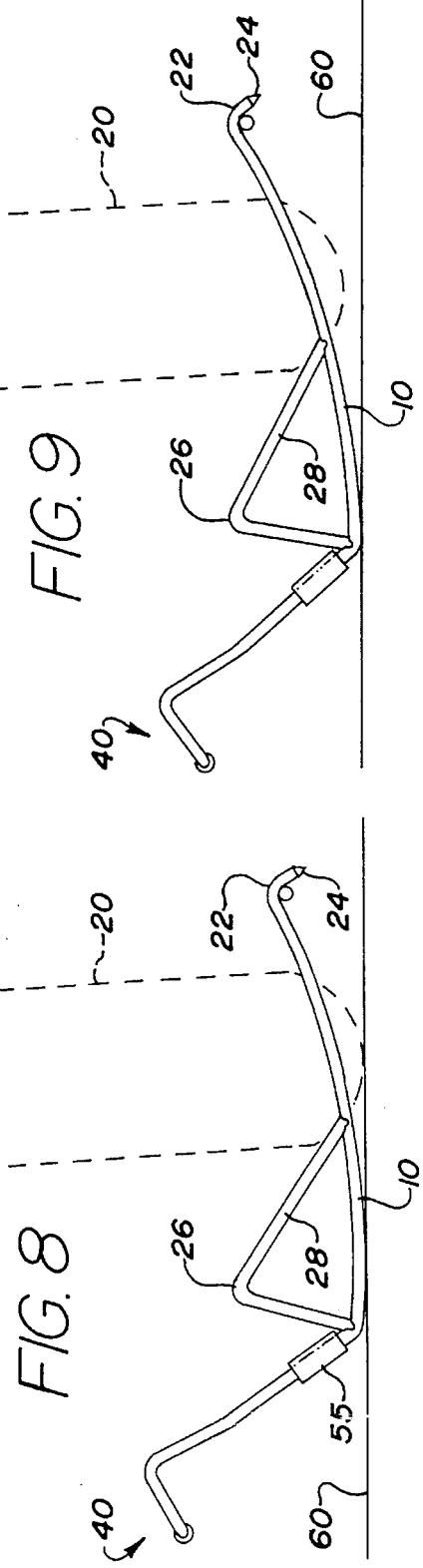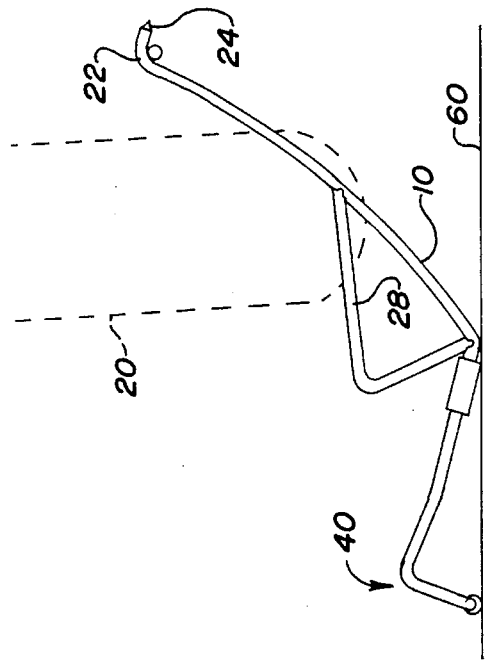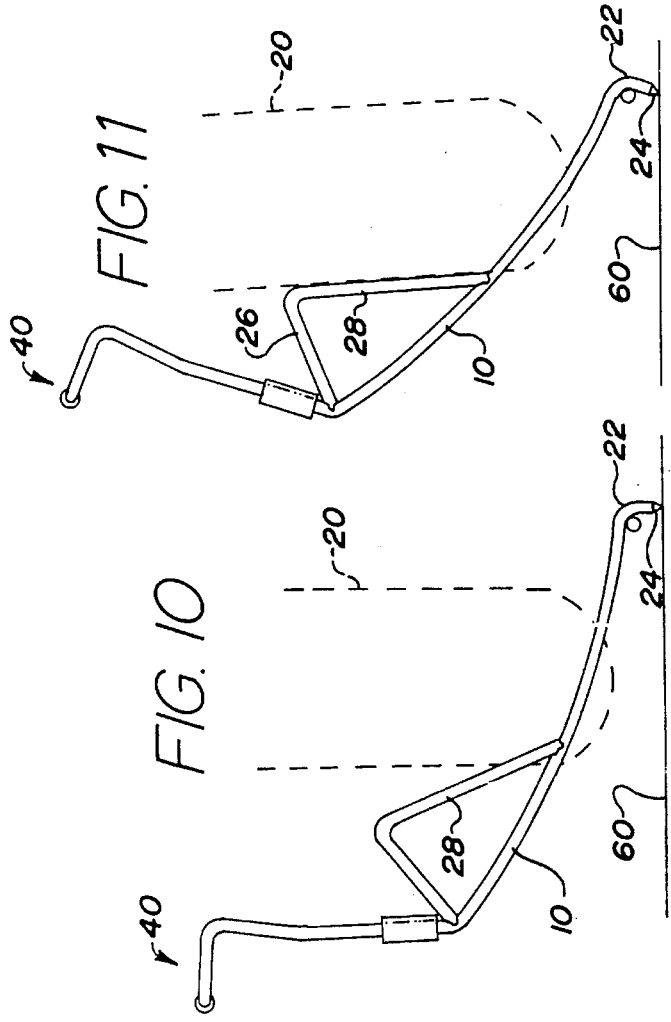

TIRE LIFT TOOL

BACKGROUND OF THE INVENTION

The present invention relates to tools for assisting in changing a vehicle tire and wheel assembly, and in particular to a tool which assists in positioning and lifting the vehicle tire and wheel assembly into position for installing on, or removal from, a vehicle hub.

The process of removing or installing a vehicle tire and wheel assembly from or onto a vehicle hub is complicated by the necessity of lifting and positioning the tire and wheel assembly into position relative to the vehicle hub. The tire and wheel assembly is typically heavy and unwieldy, which adds to the difficulty of precisely aligning the lug bolt openings in the wheel for alignment with the lug bolts on the vehicle hub. Various types of tools and apparatus have been suggested as solutions to this problem.

The general concept of a tool to help lift and position a tire onto a vehicle hub is disclosed in patents going back to the time of the invention of the automobile. Many of the tire lifts or tire changing tools are quite heavy and cumbersome. They appear to be primarily used to move aria position tires in garages. Most of them are wheeled and generally use a fulcrum or lever type principle to maneuver the tire into position.

U.S. Pat. No. 3,828,955 discloses a tire changing tool which uses a flat surface with an upturned rim for supporting the tire. The tool is wheeled with a long handle to provide leverage. The tire is lifted by pushing down on the handle of the lever and the tool is pivoted about the axle of the wheels.

U.S. Pat. No. 4,256,430 by contrast has a seat which allows the weight of the user to lift the tire into position.

U.S. Pat. No. 3,378,154 also uses a long handle for leverage. The tire, however, is carried in a cradle between a pair of rollers.

U.S. Pat. No. 2,207,443 is somewhat simpler but it also includes wheels, cradle with an upturned edge and handle.

U.S. Pat. No. 2,691,454 discloses a wheel mounting device which cradles the tire between a pair of rods. The tire is lifted into position by pushing down on a handle so as to pivot the cradle against the ground.

In U.S. Pat. No. 5,176,487, the wheel is supported in a pair of arms which have caster wheels or skids at the outer ends. The handle is used to lift the cradle so as to pivot the cradle about the skids on the outer ends of the arms. The handle is intended to fold for compact storage.

U.S. Pat. No. 3,555,583 also discloses a compact tool for lifting a tire into position. This tool is also intended to function as a lug wrench.

U.S. Pat. No. 2,504,345 is a fairly simple tire changing tool with a pair of lever arms and a handle for lifting the tire into position between the lever arms.

U.S. Pat. No. 2,815,877 discloses a tool for cradling a tire between two lever arms and lifting the tire into position by downward pressure on a handle. The fulcrum point is a skid mounted to the underside of the handle.

Numerous other patents have been issued for wheeled dollies that are considerably larger and more complex than the tire lift tool of the present invention.

SUMMARY OF THE INVENTION

The present invention provides for a simple, light weight, compact, storable tool for assisting in lifting and positioning a tire and wheel assembly into position for installation on or removal from a vehicle hub. The present invention comprises a pair of arcuate base members, which together form a cradle for receiving the tire. The arcuate base members terminate in a pair of pivot members with beveled points contacting the ground surface for a secure steady lift. Each of the arcuate base members is provided with a lifting member disposed on the proximal end of the arcuate base member so as to support and steady the wheel and tire assembly in a substantially vertical position as it is lifted onto the hub. Handle means attached to the proximal end of the arcuate base members provide the means for manually raising the tool and pivoting it about the pivoting members so as to effect the lifting of the tire and wheel assembly into the proper position relative to the vehicle hub.

In one embodiment of the present invention, the handle means may be folded so as to provide a compact configuration for storage.

The tire lift tool of the present invention is preferably constructed of steel rods so as to provide a simple, compact, light weight and sturdy device.

It is therefore an object of the present invention to provide for a tire lift tool to assist in the lifting and positioning of a tire and wheel assembly for installation on or removal from a vehicle hub.

It is a further object of the present invention to provide for a tire lift tool which is simple in construction, compact, light weight and easily stored.

It is an additional object of the present invention to provide for a tire lift tool which may assume a compact storage configuration through the application of folding handles.

BRIEF DESCRIPTION OF THE DRAWINGS

FIG. 4 is a top plan view of the tire lift tool.

FIG. 5 is a bottom plan view of the tire lift tool.

FIG. 6 is a top plan view of the tire lift tool with the handle folded for storage.

FIG. 7 is a bottom plan view of the tire lift tool with the handle folded for storage.

FIG. 8 is a right side elevation of the tire lift tool showing a vehicle tire in broken outline received between the arcuate base members.

FIG. 9 is a right side elevation of the tire lift tool with a vehicle tire shown in broken outline received between the arcuate base members. FIG. 9 illustrates the use of the radius of the arcuate base members to lift the vehicle tire from the ground so as to assist in positioning the vehicle tire in proximity to the vehicle hub.

FIG. 10 is a right side elevation of the tire lift tool with a vehicle tire shown in broken outline. This figure illustrates how the vehicle tire may be lifted from the ground by rotating the tire lift tool about the pivoting members.

FIG. 11 is a right side elevation of the tire lift tool with the vehicle tire shown in broken outline. This figure illustrates how the lifting members act to brace the vehicle tire in a vertical position after additional rotation of the tire lift tool about the pivoting members.

FIG. 12 shows an alternative method of lifting the vehicle tire into position by rotating the tire lifting tool in the opposite sense to that shown in FIGS. 10 and 11 and employing the lifters to provide lifting support.

DETAILED DESCRIPTION OF THE PREFERRED EMBODIMENTS

Figure 2:
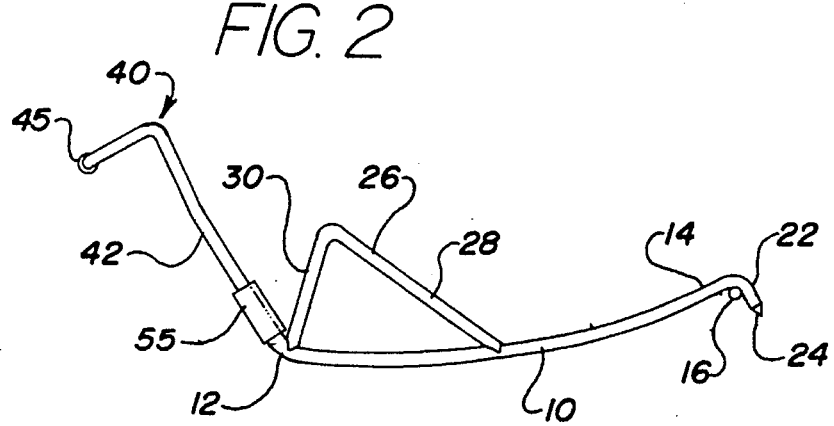
FIG. 2 is a right elevation of the tire lift tool.
Figure 3:
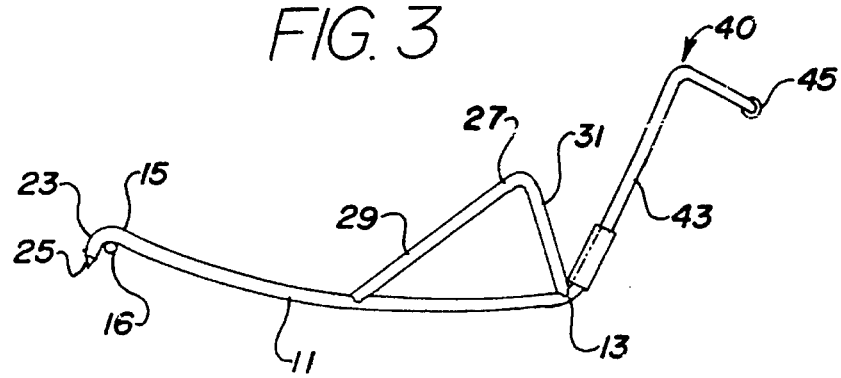
FIG. 3 is a left elevation of the tire lift tool.

With reference to FIGS. 2 and 3, the tire lift tool of the present invention comprises a pair of arcuate base members 10, 11. The arcuate base members 10, 11 have respective proximal ends 12, 13 and distal ends 14, 15.

Figure 1:
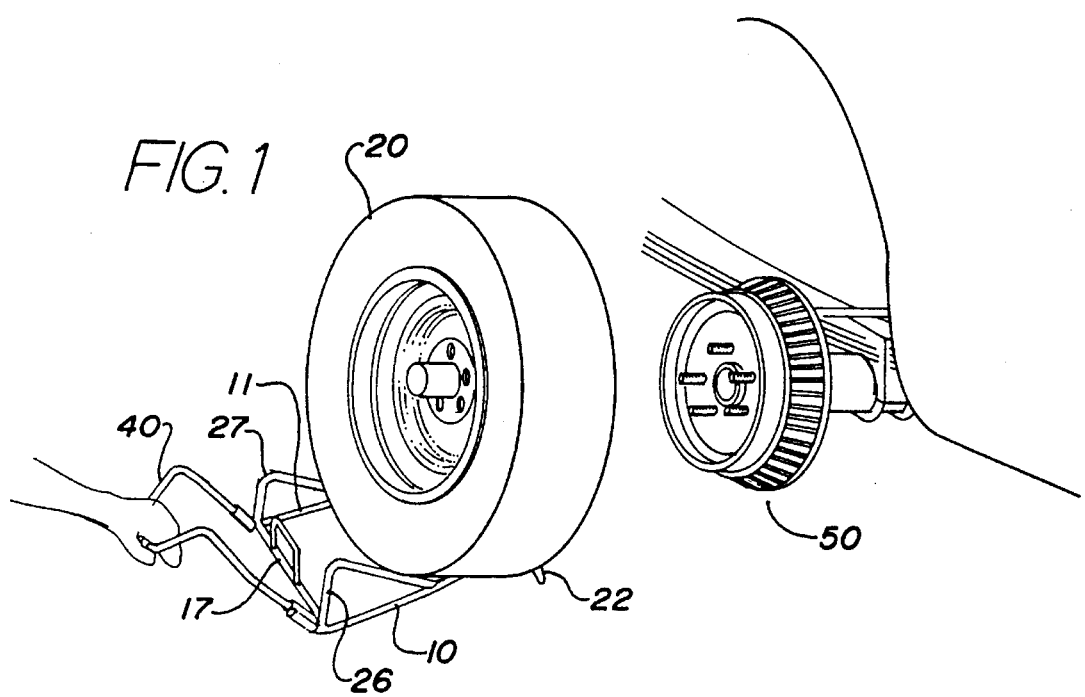
FIG. 1 is a perspective view of the tire lift tool with a vehicle tire and wheel assembly disposed thereon in proximity to a vehicle hub.

The arcuate base members 10, 11 are upwardly curved so as to allow the tire lifting tool to be employed in a rocking fashion as will be described more fully below. With respect to FIGS. 4 and 5, it may be seen that the arcuate base members 10, 11 are spaced apart by distal transverse brace member 16 and proximal transverse brace member 17. The spaced relation between the arcuate base members 10, 11 define a cradle to receive and support a vehicle tire and wheel assembly 20 as shown in FIG. 1.

Each of the arcuate base members 10, 11 are provided with pivoting members 22, 23 respectively. At the respective distal ends 14, 15 of each arcuate base member 10, 11, the pivoting members 22, 23 depend from the distal ends 14, 15 of the arcuate base members 10, 11 generally along a radius of curvature of the arcuate base members 10, 11. Each of the pivoting members 22, 23 terminate in a beveled point 24, 25. The beveled points 24, 25 provide for a secure point of rotation that tends to grip the ground surface without sliding. The use of the tire lifting tool to rotate about the beveled points 24, 25 will be described more fully below.

Again with reference to FIGS. 2 and 3, each of the arcuate base members 10, 11 are provided with lifting members 26, 27. The lifting members 26, 27 are disposed toward the proximal ends 12, 13 of each arcuate base member 10, 11. Each of the lifting members 26, 27 comprise a respective distal leg 28, 29 and respective proximal leg 30, 31. The respective distal legs 28, 29, proximal legs 30, 31 and the included portion of the respective arcuate base members 10, 11 form a triangular shape. The precise lengths of the sides of the described triangle as well as the angles formed therebetween are not critical. However, the relative proportion should be selected so as to provide the appropriate support for the vehicle tire and wheel assembly 20 during the lifting operation described more fully below. When the tire and wheel assembly 20 is lifted into the approximately correct position for installation on or removal from the vehicle hub (shown in FIG. 1 as 50), it is desirable that the distal legs 28, 29 be in a substantially vertical orientation so as to support the tire and wheel assembly 20 in a substantially vertical orientation.

Again, with reference to FIGS. 2 and 3, the tire lift tool is provided with a handle 40. The handle 40 is attached to the proximal ends 12, 13 of the arcuate base members 10, 11.

In the preferred embodiment of the present invention, the handle 40 comprises a pair of L-shaped legs 42, 43 attached to the proximal ends 12, 13 respectively. The L-shaped legs 42, 43 are joined by a transverse grip 45.

In another embodiment of the present invention, the handle 40 may be pivoted for folding into a compact storage configuration. The folding action may be seen with respect to FIGS. 6 and 7. The L-shaped legs 42, 43 of the handle 40 are pivotally connected to the respective proximal ends 12, 13 of the arcuate base members 10, 11 about pivot pins 46, 47. For storage the handle 40 may be folded about the pivot pins 46, 47 into the area of the cradle defined by the arcuate base members 10, 11. This folded storage position minimizes the size and reduces the height of the tire lifting tool for ease of storage.

Figure 13A:
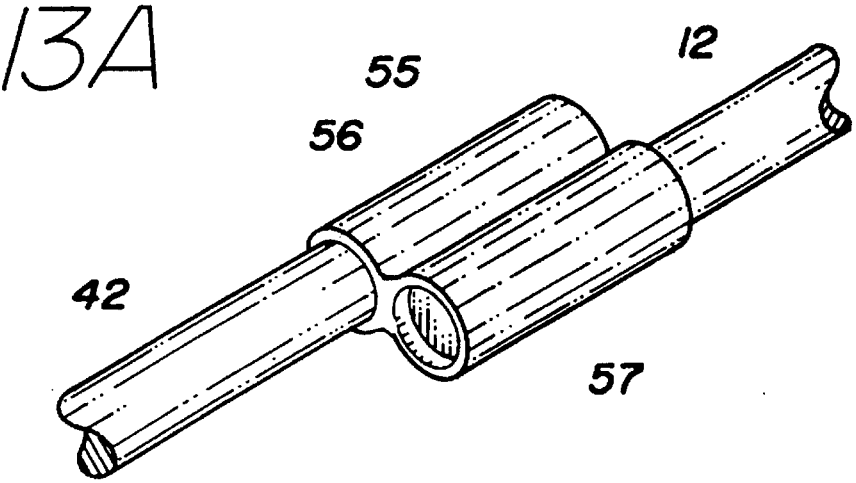
FIGS. 13A and 13B are partial perspective views showing the handle locking means in the locked and unlocked positions respectively.
Figure 13B:
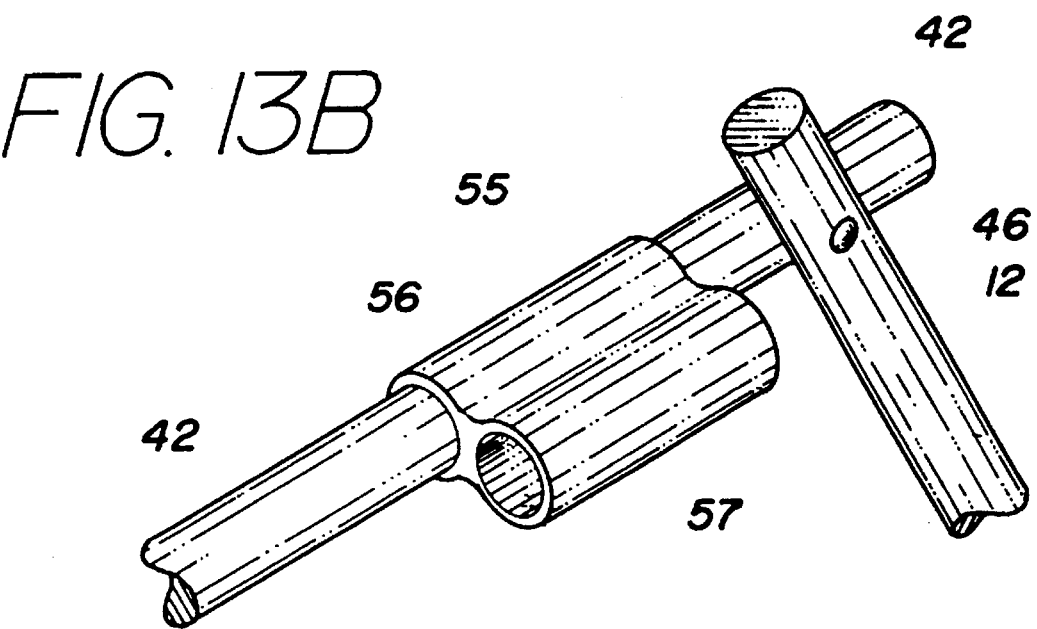

When the handle 40 is unfolded for use, it may be locked into position as shown with respect to FIGS. 13A and 13B. A locking member 55 is slidably received about the L-shaped leg 42 of the handle 40. The locking member 55 comprises a pair of conjoined cylinders 56, 57. One of the pair of conjoined cylinders 56 is slidably received on the L-shaped leg 42 of the handle 40. The other one of the pair of conjoined cylinders 57 is slidable onto the proximal end 12 of the arcuate base member 10. By sliding the locking member 55 so as to slide cylinder 57 onto the proximal end 12, the handle 40 is locked in the fully open and deployed position. By sliding the locking member 55 so as to disengage the cylinder 57 from the proximal end 12, the handle 40 may be pivoted about the pivot pin 46 so as to place the handle 40 in the stored position. It is to be understood that the above description specifically relates only to the L-shaped leg 42 and the arcuate base member 10. An analogous description applies to the L-shaped leg 43 and arcuate base member 11.

The employment of the tire lift tool of the present invention may be described with reference to FIGS. 1 and 8–12. The tire lift tool is first unfolded with the handle 40 in the fully deployed position and the locking member 55 in the locked position. The tire lift tool is placed on the ground surface 60. Particularly with reference to FIG. 8, it may be seen that the arcuate base members 10, 11 have at least a portion in close contact with the ground surface 60. If the tire and wheel assembly 20 is to be positioned for installation onto the vehicle hub 50, the tire and wheel assembly 20 may be simply rolled over the arcuate base member 10 or 11, and thereby positioned within the cradle formed by the arcuate base members 10, 11 and the transverse brace members 16, 17.

With reference to FIG. 9, the tire and wheel assembly 20 may be lifted from contact with the ground surface 60 by slight downward pressure on the handle 40. This causes the tire lifting tool to rock backward along the curvature of the arcuate base members 10, 11 so that the tire and wheel assembly 20 is no longer contacting the ground surface, and the weight of the tire and wheel assembly 20 is born by the arcuate base members 10, 11. In this position the user may slide the tire lift tool along the ground surface 60 until the tire and wheel assembly 20 is positioned in proximity to the vehicle hub 50.

With reference to FIG. 10, the tire and wheel assembly 20 may then be lifted further by the user lifting on handle 40 so as to pivot the tire lift tool about the beveled point 24 of the pivoting member 22. This allows for a greater degree of lift than would be possible by the rocking motion described with respect to FIG. 9. The beveled point 24 of the pivoting member 22 provides for a safe and secure grip against the ground surface 60 so that the wheel and tire assembly 20 may be lifted into position without any unexpected sliding motion.

It is desirable to maintain the tire and wheel assembly 20 in an essentially vertical position for the final installation onto the vehicle hub 50. As shown with respect to FIG. 11, the lifting member 26 provides the desirable vertical support for the tire and wheel assembly 20. The distal leg 28 of the lifting member 26 provides the vertical support which prevents the tire and wheel assembly 20 from falling away from the vehicle hub 50.

It is to be understood that the above description of the installation of a tire and wheel assembly 20 onto a vehicle hub 50 is particularly described with reference to the right side elements of the tire lift tool. The left side elements of the tire lift tool as shown in FIG. 3 should be understood to play a precisely analogous role in the present invention. It is also to be understood that the tire lift tool of the present invention may be employed in reverse fashion to assist in the removal of a tire and wheel assembly 20 from a vehicle hub 50.

FIG. 12 shows an alternative means of employment of the present invention to lift a tire and wheel assembly 20 into position with respect to a vehicle hub 50. In this alternative operation, the tire and wheel assembly 20 is lifted into position entirely by downward pressure on the handle 40 so that the tool is pivoted about the proximal end 12 of the arcuate base member 10. This alternative means of employment of the present invention may be desirable for the user to hold the tire and wheel assembly 20 into position by foot or knee pressure. It may also provide better access to the tire and wheel assembly 20 to assist in the assembly process.

The present invention has been described with reference to certain preferred and alternative embodiments, which are intended to be exemplary only and not by way of limitation to the full scope of the present invention as set forth in the appended claims.

What is claimed is:

1. A tire lift tool for positioning a tire and wheel assembly for installation on or removal from a vehicle hub, comprising:

(a) a pair of entirely arcuate base members, together defining an upwardly curving cradle for receiving and supporting in a generally upright orientation a tire and wheel assembly and for moving the tire and wheel assembly between a lowered position and a raised position in proximity to a vehicle hub, said base members permitting transport of the assembly along bottom sides thereof;

(b) wherein each of said arcuate base members have a distal end and a proximal end, and wherein each of said distal ends has a pivot member depending therefrom generally along a radius of curvature of said arcuate base members, and further wherein said pivot member terminates in a beveled point;

(c) upstanding leg members attached between the proximal ends and intermediate portions of the arcuate base members for stabilizing the assembly;

(d) a lifting member deployed on said proximal end of each of said arcuate base members, said lifting members disposed so as to support the tire and wheel assembly in said raised position in a generally upright orientation; and (e) handle means attached to said proximal ends of said arcuate base members for manually moving the tire lift tool between said raised position and said lowered position.

2. The tire lift tool of claim 1 further comprising folding means for folding said handle means between a storage position and a use position.

3. The tire lift tool of claim 2 further comprising locking means for locking said handle means into said use position.

\* \* \* \* \*